United States Patent Office 3,185,958
Patented May 25, 1965

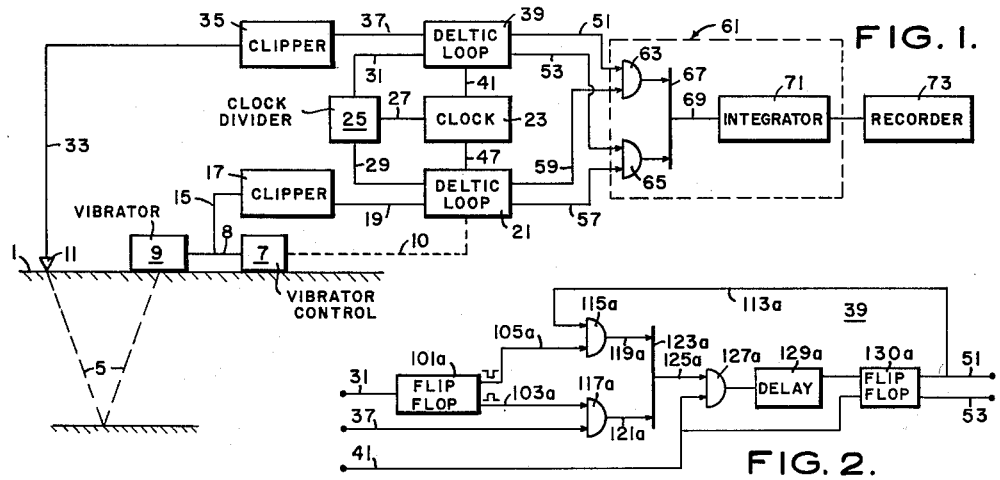
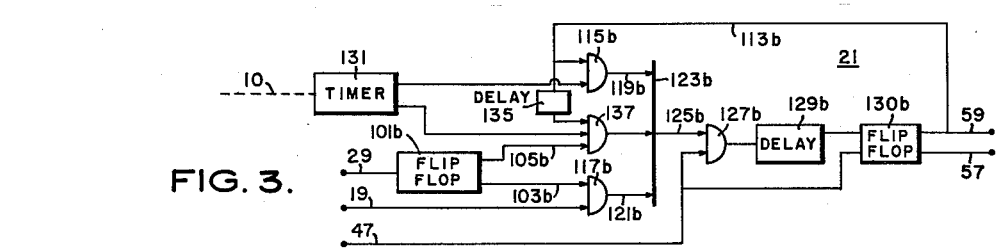
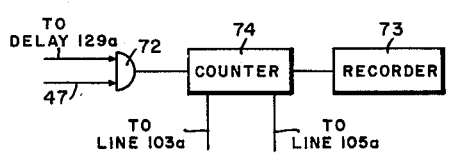

3,185,958
METHOD OF CONTINUOUS WAVE SEISMIC PROSPECTING
Horace T. Masterson, Troy N. Crook, and Alton C. Reid, all of Houston, Tex., assignors, by mesne assignments, to Esso Production Research Company, Houston, Tex., a corporation of Delaware
Filed Apr. 9, 1962, Ser. No. 186,124
8 Claims. (Cl. 340—15.5)

This invention relates to the art of seismic prospecting, and more particularly to seismic prospecting techniques wherein elongated wave trains of seismic signals are injected into the earth.

In the usual type of seismic prospecting, a relatively sharp pulse of elastic wave energy is injected into the earth from a location at or near the earth's surface, and the resulting seismic waves are detected by means of geophones located at a plurality of detecting stations or locations spaced apart on the earth's surface. Electrical output signals from the geophones are simultaneously recorded to form a multiple trace seismogram. The seismogram is examined and operated on in various ways to pick out reflected, refracted, and diffracted waves therein that are indicative of the nature of subsurface strata. In order to determine the depth of a given stratum, the two-way travel time of the seismic waves between the earth's surface and the stratum (as well as the velocity of the waves in the strata through which the waves travel) must be measured very exactly. In this method of seismic prospecting, all of the elastic wave energy is injected into the earth at substantially the same time, and undesired components of the traces of the seismograms may be eliminated by frequency discrimination.

In another type of seismic prospecting that has found relatively limited use to date, an elongated vibratory seismic signal or wave train is injected into the earth. Preferably, the injected seismic signal is nonrepetitive during a time interval which is substantially longer than the travel time of the signal along the longest travel path of interest. Expressed in another manner, the duration of the signal is at least as long as the travel time of the signal along any of the paths by which it reaches a detecting location at usable energy levels. In the usual case in reflection seismographing, the longest travel path of interest will be the shortest path from the seismic wave source to the deepest reflecting horizon which it is desired to delineate and back to the earth's surface at the detecting location farthest removed from the seismic source. Seismic waves produced by the vibratory seismic signal are detected at one or more detecting locations removed from the injecting location. It has been the practice to produce a counterpart electrical replica of the injected signal (i.e., an electrical signal substantially identical to the injected seismic signal) by means of a geophone at the injecting location. This geophone may be either connected to the vibratory source or positioned in the earth near the source. The replica signal is cross correlated with each signal produced at the detecting stations. The cross correlation is carried out at a plurality of time-phase relationships between said each signal and the replica signal. The time-phase relationship of the replica signal and each signal cross correlated therewith which yields the greatest value of correlation is used as a parameter of the travel time of the injected signal from the injecting location to the detecting location corresponding to said each signal. Correlation between the replica signal and an electrical signal representative of detected seismic waves typically has been accomplished by initially recording both signals, reproducing the signals as time series, combining the time series emphasizing amplitude variations in the combined time series, integrating the resulting signal, and shifting the time-phase relationship (or $\tau$) between the reproduced signals with respect to their time-phase relationship as originally recorded. The general method is described in U.S. Patent No. 2,989,-726—Crawford et al. and will be recognized as being of the type operating in the time domain.

A form of injected signal that has been widely used in the above-described method is that of a sinusoid which is continuously varied in frequency so as to be nonrepetitive over a desired time interval. The cross correlation curve resulting from a given reflection obtained with such a signal is that of a major lobe flanked by minor lobes diminishing in amplitude and extending from the major lobe in both directions on the "$\tau$" axis of the correlation curve. The side lobes may be of sufficient amplitude to mask all of the lobes of a relatively smaller amplitude correlation signal resulting from a reflection from a relatively poor reflecting horizon located near a good reflecting horizon. A much better type of injected seismic signal is a signal having an amplitude density spectrum given by the formula $$\frac{\sin X}{X}$$

where X represents frequency over a preselected frequency spectrum. Preferably, this type of seismic signal is formed according to a binary code of maximal length. The term "binary code of maximal length" signifies a binary code which may be represented as a reference time series, which code is formed by operating on a binary code group of N digits according to a predetermined rule of formation such that the code group will not repeat itself before $2^N-1$ digits. Expressed in another manner, a binary code group of maximal length is a binary code wherein a binary group of N digits at the beginning thereof is not repeated until the code has at least $2^N-1$ digits therein. For example, if the five digit code group 01101 is used, N will be equal to 5 and $2^N-1$ equals 31. A binary code of maximal length can be formed therefrom by starting off with the five digit code group 01101 and setting the next digit equal to the sum modulo 2 of the first, second, third, and fifth digits preceding it; this results in the six digit code group 011010. This process is repeated with the resulting code group 011010, again setting the next element equal to the sum modulo 2 of the first, second, third, and fifth digits preceding it to form the seven element code group 0110100. The process is repetitively repeated to form each successive digit and the following binary code is obtained before any five digit code group is repeated

0110100001100100111110111000101

By applying the above-specified rule of formation, it will be found that after 31 digits, the sequence will repeat. For a more complete discussion of shift register or null sequence code of maximal length, reference may be had to the following: "The Synthesis of Linear Sequential Coding Networks" by D. A. Huffman, Proc. Third London Symposium on Information Theory, September 1955; and "Several Binary-Sequence Generators" by N. Zierler, Tech. Rep. 95, Lincoln Laboratory, Massachusetts Institute of Technology, Cambridge, Massachusetts, September 1955.

Injecting a binary code of maximal length into the earth in the form of a seismic signal presupposes that a characteristic of the seismic signal is variable between two distinct conditions. For example, the amplitude may be varied between two magnitudes or the phase may be varied between two phase relationships. As a specific example, the injected signal may be made from a constant frequency sinusoidal signal of constant amplitude, the phase of which is varied between mutually opposite phase relationships in accordance with a binary code of maximal length having a time duration at least equal to twice the travel time of seismic waves between the earth's surface and the deepest earth reflecting horizon of interest. As indicated above, it has been the usual practice to record the electrical replica signal and the electrical signal produced by detecting the seismic signal in reproducible form so that the electrical signals subsequently may be reproduced and cross correlated to determine the time-phase relationship producing a maximum correlation value. For the following reasons it has been found necessary to perform a correlation operation at a time subsequent to the time of the seismic observation. First, the correlation operation performed according to prior art techniques consumes an inordinately large amount of time. Second, it is extremely costly to maintain a seismic crew in the field so that as much as possible of the crew's time must be spent making seismic observations. Manifestly, it is desirable to perform a correlation operation immediately after making a seismic observation so that the results thereof can be used as a guide for immediately subsequent seismic observations. Therefore, it is desirable to have available a technique for performing "on line" correlation.

In accordance with the teachings of the present invention, a continuous wave seismic observation is carried out in accordance with prior art techniques such as described above by transmitting or injecting a vibratory seismic signal into the earth and detecting seismic waves at one or more detecting locations spaced apart from the injecting location. An electrical replica of the signal as injected is produced along with electrical signals representative of the vibratory signal received at each detecting point utilized. First and second electrical pulse trains are produce by producing electrical pulses at sailent points in the waveform of the electrical replica of the injected signal, and by producing electrical pulses at salient points in the waveform of the electrical signal representative of the seismic signals received at the detecting location. The first and second pulse trains are thereupon compressed in real time by increasing the pulse repetition rate thereof while maintaining constant the relative time spacing between the pulses. The first and second compressed pulse trains are therupon correlated at a predetermined number of time-phase relationships to each other whereby travel time is established in accordance with the value of time-phase relationship between the pulse trains corresponding to a maximum value of correlation magnitude.

Preferably, the pulse trains are formed by repetitively detecting the polarity of an electrical signal at a repetition rate greater than the highest frequency of the electrical replica of the injected signal, and producing a pulse when the polarity of the electrical signal is of a given polarity. In this manner a pulse train is produced when the electrical signal from which the pulse train is being formed is of a given polarity.

Further in accordance with a preferred manner of carrying out the invention, the compressed pulse train formed from the electrical replica of the injected signal is stored in reproducible form and is continuously reproduced while the detected signals are being converted into a pulse train and compressed in real time. Further, while the second signal is being converted into a pulse train and compressed in real time, there is successively reproduced a plurality of different overlapping portions of the second pulse train equal in duration to the first pulse train, which different overlapping portions are synchronized with the repetitively reproduced pulse train and cross correlated therewith.

Objects and features of the invention not apparent from the above discussion will become evident upon consideration of the following detailed description thereof taken in connection with the accompanying drawing, wherein:

FIG. 1 is a schematic diagram of apparatus in accordance with the invention;

FIG. 2 is a schematic electrical diagram of apparatus suitable for use as delay line time-compression apparatus 39 of FIG. 1;

FIG. 3 is a schematic diagram of apparatus suitable for use as delay line time-compression loop apparatus 21 of FIG. 1;

FIG. 4 is a waveform of square representation of a binary code of maximal length;

FIG. 5 is a waveform on the same time scale as FIG. 4 representative of sinusoidal constant frequency seismic signal varied between two phases to represent the binary code of maximal length shown in FIG. 4;

FIGS. 6A through 6G are waveform representations of signals which may appear in the apparatus of FIG. 1, which waveform representations are useful in understanding the operation of the apparatus of FIG. 1; and FIG. 7 is a schematic diagram of an alternative circuit to be used in a portion of the circuit of FIG. 1.

At this point it is well to define certain terminology used herein. The term "deltic loop" is applied to a time-compression apparatus wherein a portion of a low frequency signal of duration $T'$ is sampled at N different times separated by a shorter interval of period T. The sequence of N samples is squeezed together to form a high speed replica of the incoming signal wherein the time compression factor is given by $T'/T$ which is equal to N, the number of samples. The replica is stored in a high speed recirculation storage loop of recirculation period T so that the compressed information is repetitively available for the convenient application of signal processing methods. The time-compression and sampling process is continuously carried out by removing the oldest sample in the replica and replacing it with a new one each time the replica completes another cycle of circulation in the storage channel. Cross correlation of two independent low frequency input signals can be obtained by using a deltic loop for each input to obtain a high speed replica of each signal, storing the replica of one of the input signals in a stationary "storage channel" wherein the replica merely repetitively circulates without replacement of the oldest sample therein, and comparing the replica of said one of the input signals with the precessing replica of the other input signal.

With reference now to the schematic diagram of the seismic prospecting apparatus of FIG. 1, there is shown a vibrator 9 positioned on the earth's surface 1, and a geophone 11 positioned at a detecting location remote from vibrator 9. In accordance with the usual practice in seismology, more than one geophone may be used at each detecting location, interconnected to produce a single electrical signal, and more than one detecting location may be spaced apart on either or both sides of the vibrator. The vibrator 9 may be any of the usual types of vibrators known to the art, and preferably is an electrohydraulic vibrator such as is manufactured by the M. B. Electronics Company of New Haven, Connecticut, and by the Ling Electronics Company of Anaheim, California. Such vibrators utilize a hydraulically actuated piston to vibrate an object, and control the hydraulic force on the piston in accordance with variations in the amplitude of a relatively small amplitude electrical signal connected thereto. The vibrator 9 is coupled to a vibratory control unit 7 by electrical lead 8. The vibratory control unit 7 may be a magnetic tape reproducing unit, and the vibratory signal may be prerecorded on the magnetic tape for repetitive reproduction by the reproducer. Other types of vibratory control units known to the art may be utilized.

The output signals from vibratory control unit 7 and geophone 11 respectively are applied to clipper or limiter circuits 17 and 35 through electrical leads 15 and 33.

The output signals from clippers 17 and 35 are applied through leads 19 and 37 to delay line time-compression apparatus 21 and 39, respectively, which are known in the art as deltic loops. Deltic loops are described in an article in the periodical Electronics, vol. 34, pp. 191–193. The function of the deltic loops 21 and 39 is to compress pulse trains from clippers 17 and 35 by decreasing the real time spacing between individual pulses in a given pulse train while maintaining constant the relative time spacing between said individual pulses. Expressed otherwise, the deltic loops increase the pulse repetition rate of pulse trains applied thereto while maintaining constant the relative time spacing between the pulses in the pulse train. Control signals for controllably actuating deltic loops 21 and 39 are derived from an electronic clock 23 adapted to produce a constant frequency, high frequency output signal on leads 27, 41, and 47. The signals on leads 41 and 47 are applied directly to deltic loops 39 and 21, respectively, while the output signal on line 27 is decreased in frequency or repetition rate by clock divider 25, and the output signals are applied to deltic loops 39 and 21 by leads 31 and 29. A suitable clock is a high frequency oscillator driving a pulse generator such as that designated Model SC40 by Computer Control Company of Los Angeles, California. A suitable clock divider is a counter such as that built and designated Model LA40 by Lavoie Instrument Company, of Morganville, New Jersey. Suitable deltic loop circuits for deltic loops 39 and 21 are illustrated in FIGS. 2 and 3 respectively, and will be described below.

Output signals from deltic loop 39 appear on leads 51 and 53, and output signals from deltic loop 21 appear on leads 57 and 59. In a preferred form of the invention, the presence of pulses on leads 51 and 59 are indicative of a given condition which may be a binary digit 1, whereas pulses on leads 53 and 57 are indicative of an opposite condition which may be the binary digit 0. Leads 51 and 59 are connected to an AND circuit 63 while leads 53 and 57 are coupled to AND circuit 65. The output signals of AND circuits 63 and 65 are coupled to integrator 71 through an OR circuit 67. AND circuits 63 and 65, OR circuit 67, and integrator 71 make up a coincidence-type correlator. Whenever input pulses appear simultaneously on leads 51 and 59 or on leads 53 and 57, an output pulse will appear on lead 69 from OR circuit 67. Pulses appearing at lead 69 are applied to integrator 71. The output signal from integrator 71 is coupled to recorder 73 for recordation thereby. The over-all operation of the apparatus of FIG. 1 will be described below after discussion of the circuits of FIGS. 2 and 3, and waveforms of FIGS. 4 and 5.

The deltic loop 39 illustrated in FIG. 2 utilizes three AND circuits 115a, 117a, and 127a, and an OR circuit 123a. Each of the AND circuits is adapted to produce an output signal whenever signals are simultaneously applied to the input circuits thereof. OR circuit 123a is adapted to produce an output signal whenever input signals are coupled to either of the input circuits thereof. The output signals form AND circuits 115a and 117a are coupled to the input circuits of OR circuit 123a by lines 119a and 121a, respectively, and the output signal from the OR circuit 123a is coupled to AND circuit 127a by line 125a. A high frequency clock signal from lead 41 is coupled to the other input signal of AND circuit 127a so that an output signal will be produced thereby whenever signals are simultaneously received from OR circuit 123a and clock 23 through lead 41. The output signals from AND circuit 127a are delayed by a fixed time delay means 129a and are coupled to one of the input circuits of AND circuit 115a through flip-flop circuit 130a. Flip-flop circuit 130a also receives clock signals from line 41, and is adapted to produce an output pulse on line 51 when pulses are concomitantly recieved from time delay circuit 129a and line 41, and to produce a pulse on line 53 when no pulse is received from time delay circuit 129a concomitantly with reception thereby of a pulse from line 41. A flip-flop circuit that will accomplish this function is described in Catalog "H" of Computer Control Company of Los Angeles, California.

The clipped geophone signal from clipper 35 appearing on line 37 is applied to one of the input circuits of AND circuit 117a. Control signals for AND circuits 115a and 117a are derived from the output circuits of a monostable multivibrator or flip-flop circuit 101a which receives trigger pulses from clock divider 25 through line 31. The pulses applied to AND circuit 115a through line 105a are the complements of the signals applied to AND circuit 117a through line 103a so that, assuming that the clock signals applied flip-flop circuit 101a are of 1 microsecond duration and have a repetition rate of 1000 pulses per second, a 1-microsecond activating pulse will be applied to AND circuit 117a and a 999-microsecond activating pulse will be applied to AND circuit 115a by flip-flop circuit 101a. Thus, flip-flop circuit 101a will bias-on AND circuits 115a and 117a in alternation.

The over-all operation of the circuit of FIG. 2 is as follows. Assume that the time delay provided by delay circuit 129a is 999 microseconds and that trigger signals of 1 microsecond duration and a repetition rate of 1000 p.p.s. are applied to flip-flop circuit 101a. The first pulse applied to AND circuit 117a on line 37 will pass through AND circuits 117a and 127a and OR circuit 123a, and will be delayed for 999 microseconds by delay circuit 129a. Flip-flop circuit 130a will be triggered so that a pulse will appear on line 51 and also will be applied through line 113a to the input of AND circuit 115a. Since circuit 115a is biased-on by the output signal from flip-flop circuit 101a, the pulse will pass through AND circuit 115a and will continue circulating in the storage loop defined by AND circuits 115a and 127a, OR circuit 123a delay circuit 129a, and flip-flop circuit 130a to produce an output pulse every thousand microseconds on line 51. One microsecond after the first pulse passes through AND circuits 115a and 127a, another activating pulse will be applied to AND circuit 117a on line 103a, and will produce a pulse in the output of AND circuit 117a provided a signal concomitantly appears on lead 37. In effect then, AND circuit 117a applies a pulse to OR circuit 123a every 1001 microseconds provided that an input signal concomitantly appears on line 37. Each pulse or lack of pulse applied to OR circuit 123a by AND circuit 117a precedes the immediately previously injected pulse or lack of pulse. After 1 second the loop will be full. Thereafter, the oldest pulse circulating in the loop will be eliminated because AND circuit 115a will be biased-off by the signal appearing on line 105a when the oldest pulse is applied to the input of AND circuit 115a. Therefore, the oldest information (pulse or lack of pulse) circulating in the storage loop is continuously removed after the loop is full. In effect then, the apparatus shown in FIG. 2 repetitively samples the signal applied thereto on line 37 to form a pulse train indicative of the signal or lack of signal at each sampling, compresses the pulse train in real time, and continuously removes the oldest pulse in the pulse train and replaces it with a new one each time the pulse train completes a cycle of circulation in the storage loop thereof. Stated in another manner, each pulse produced by AND circuit 117a is introduced in a compressed pulse train of N bits at the beginning of the train, then precesses slowly through the compressed train until it appears N times on output lead 51, after which it is removed from the pulse train.

The circuit of FIG. 3 is suitable for use as deltic loop 21 and in certain respects is the same as the apparatus of FIG. 2. Circuit elements in FIGS. 2 and 3 having the same reference numerals and differing in designation only by suffix letters, are identical and perform the same functions. The circuit of FIG. 3 differs from the circuit of FIG. 2 in the following respects. An AND circuit 137 is added having its output connected to an input circuit of OR circuit 123b. A time delay circuit 135 is connected between line 113b and an input circuit of AND circuit 137. The output circuit of flip-flop circuit 101b is connected to an input circuit of AND circuit 137 rather than to an input circuit of AND circuit 115b. A timer circuit 131 is provided which applies an activating signal to AND circuit 137 for a given interval of time, and thereafter switches the activating signal to AND circuit 115b. The timer circuit may consist of a D.C. bias source and a conventional spot timing switch. The output channels of timer 131 are respectively connected to the input circuits of AND circuits 115b and 137 so that the AND circuits will be biased-on thereby in alternation. The timer 131 is connected by a mechanical or electrical lead 10 to vibratory control 7 so as to begin timing upon activation of vibrator 7 so as to bias-off AND circuit 137 and bias-on AND circuit 115b after a timed-out interval. (Prior to the end of the interval, AND circuit 115b was biased-off and AND circuit 137 was biased-on.) The time delay provided by delay circuit 135 is equal to the time duration between pulses applied to line 47. The timed-out interval of timer 131 is equal to the time delay provided by delay element 129a times the quantity $T'/T$, previously defined. The time delay provided by element 129a is equal to the sum of the time delay effected by elements 129b and 135. The operation of the apparatus of FIG. 3 is substantially the same as that of FIG. 2 until timer circuit 131 biases-on AND circuit 115b and biases-off AND circuit 137. Thereupon the pulse train in the storage loop of the circuit 21 at the time that timer circuit 131 is actuated will continue to circulate in the storage loop and the bits thereof will not be replaced inasmuch as AND circuit 137 is biased-off. The time delay in the storage loop of circuit 21 now being slightly less than the time delay in the storage loop of circuit 39, in effect there will be a precession of information in the storage loops of the circuits 21 and 39.

It should be noted that when a pulse appears on one of output lines 51 and 59, no pulse will appear on the corresponding line 53 or 57, and that when no output pulses appear on one of lines 51 and 59, an output pulse will thereupon appear on the corresponding line 53 or 57. A clock signal from line 47 resets flip-flop circuit 130b and clock pulses appear on line 57. For a more complete general explanation of deltic loops, reference is made to the article in Electronics, supra.

With reference now to FIG. 4, there is reproduced the binary code of maximal length discussed above and a waveform indicative of the binary code of maximal length wherein signals of one polarity indicate the binary digit 1, and signals of the opposite polarity indicate the binary digit 0. Manifestly, it is very difficult to inject a signal having such a waveform into the ground with a vibrator or similar device; it is more feasible to inject a signal having continuously variable amplitude, such as a sine wave. The binary code of maximal length can be formed from a sine wave signal by varying the signal between two conditions, such as by varying the phase thereof. It is manifest from an inspection of FIG. 5 that when the signal is of one phase, the binary digit 0 is represented, and that when the signal is of the opposite phase, the binary digit 1 is represented.

With reference again to FIG. 1, let it be assumed that vibrator 9 produces a signal such as that shown in FIG. 5, under the control of vibrator control unit 7. The seismic signal produced by vibrator 9 will be injected into the earth and a portion thereof will follow ray path 5 and will be detected by geophone 11. The electrical output signal from vibrator control unit 7 is transmitted on line 15 to clipper 17 whereat it is converted into a pulse train. Assuming, for example, that a portion of the signal is as shown in FIG. 6A, a signal having the waveform shown in FIG. 6B will appear at the output of clipper 17, and a pulse train as shown in FIG. 6C will appear at the output of AND circuit 117b (see FIG. 3). Similarly, assuming that a seismic signal as shown in FIG. 6E is applied to clipper 35, the wave train shown in FIG. 6F will appear at the output of AND circuit 117a. Responsive to such signals and to the clock signals applied to the deltic loops through clock 23 and clock divider 25, the signals from AND circuits 117a and 117b will be time-compressed and will appear on lines 51 and 59 in the same form as shown in FIGS. 6C and 6F, but at a much higher repetition rate. Assuming that the signals shown in FIGS. 6C and 6F represent the signals on lines 51 and 59, signals will appear on lines 53 and 57 having shapes as shown in FIGS. 6D and 6G, further assuming the same time scale as in FIGS. 6C and 6F. The pulse trains will be correlated by correlator 61 to produce a pulse on line 69 whenever pulses appear simultaneously either on lines 51 and 59 or on lines 53 and 57. The pulses are integrated by electronic integrator 71 and the integrated signal is recorded by recorder 73. The integrator may be a "fuzzy interval" or lossy integrator such as a simple resistor-capacitor circuit or a fixed interval integrator such as described in U.S. Patent No. 3,003,696. Alternatively, an electronic counter may be used, such as Beckman Instrument Company counter Model 7070. The counter may be connected in a circuit as shown in FIG. 7. High frequency clock pulses from line 47 and output pulses from OR circuit 67 are applied to AND gate 72 to produce discrete output pulses having the duration of the clock pulses. The AND gate output pulses are counted by counter 74. Each counting interval is begun by a pulse from line 105a applied to the counter, and ended by a pulse from line 103a. The counter is reset by each pulse from line 103a and the count recorded thereby recorded by recorder 73.

When the internal storage of deltic loop 21 is fully loaded, timer 131 will bias on AND circuit 115b and bias-off AND circuit 137 so that the time-compressed signal stored in the storage loop of deltic loop 21 is reptitively reproduced and cross correlated with the signal stored in the storage loop of deltic loop 39. Inasmuch as the seismic signal from geophone 11 is continuously replacing the earliest stored portion of the signal stored in the delay unit of deltic loop 39, the output signal from time delay means 129a is constantly changing. In effect, the time-phase relationship of the replica signal applied to deltic loop 21 and the seismic signal applied to deltic loop 39 likewise is continuously changing so that the output signals from the deltic loops 21, 39 and correlator 61 will provide a constantly changing cross correlation signal to recorder 73. It is manifest that the pulse train derived from the replica signal applied to deltic loop 21 is stored in reproducible form and continuously and repetitively reproduced, and that both the signals applied to deltic loops 21 and 39 are continuously compressed in real time and that the output signals from the deltic loops are continuously cross correlated with varying time-phase relationships. Viewed in another manner, the deltic loop 39 successively reproduces a plurality of different overlapping portions of the pulse train applied thereto for cross correlation with the repetitively reproduced pulse train applied to deltic loop 21.

It is evident that the time required for correlation can be easily reduced by a factor of 1000 or more, assuming that the pulse repetition rate of clock 23 is 1000 times the delay time of delay means 129a.

It is desirable to have a seismic signal injected into the earth by vibrator 9 which is nonrepetitive for a time interval of at least 6 seconds. Assuming that the repetition rate of clock 23 is one million pulses per second and that the clock divider 25 divides by a factor of 1000, then delay means 129a must have a delay of 1000 microseconds, time delay means 135 must have a delay of 1 microsecond, and time delay means 129b must have a delay of 999 microseconds for the system of FIG. 1 to operate properly. The six-second signal can be accommodated by various techniques known to the art, such as varying the repetition rates of the clock signals and the time delays effected by the time delay units, and by connecting several deltic units, as described above, in tandem.

While the above-described apparatus is the preferred form of the invention, the invention can be carried out by other apparatuses. For example, the function of the deltic loops can be achieved by magnetic tape recording means wherein the seismic signals and replica signals are recorded at one speed and are reproduced at 100 or 1000 times that speed. It is also manifest that other modifications can be effected, such as eliminating the lines 53 and 59 and AND circuit 65 to simplify the coincidence correlator. However, lack of sensitivity of correlation will accompany such a change.

The objects and features of the invention having been completely described, what we wish to claim is:

1. In the method of measuring the travel time along at least one path of propagation through the earth between spaced first and second points thereon of a vibratory signal having a characteristic thereof varying in accordance with a binary code of maximal length and which is nonrepetitive during a time interval substantially longer than the travel time of said signal along any of those paths of its propagation through the earth by which it reaches said second point at usable energy levels, and wherein is produced an electrical replica of the signal as transmitted and an electrical signal representative of the vibratory signal as received at said second point, the improvement which comprises:

producing electrical pulses at salient points in the waveform of said electrical replica to form a first pulse train and producing electrical pulses at salient points on the waveform of said electrical signal representative of the signals as received to produce a second pulse train;

compressing said first and second pulse trains in real time to increase the pulse repetition rate thereof while maintaining constant the relative time spacing between pulses; and cross correlating said compressed first and second pulse trains at a predetermined number of time-phase relationships to each other whereby travel time is established in accordance with the value of time-phase relationship between said pulse trains corresponding to a maximum value of correlation magnitude.

2. In the method of measuring the travel time along at least one path of propagation through the earth between spaced first and second points thereon of a vibratory signal having a characteristic thereof varying in accordance with a binary code of maximal length and which is nonrepetitive during a time interval substantially longer than the travel time of said signal along any of those paths of its propagation through the earth by which it reaches said second point at usable energy levels, and wherein is produced an electrical replica of the signal as transmitted and an electrical signal representative of the vibratory signal as received at said second point, the improvement which comprises:

repetitively detecting the polarity of said electrical replica and said electrical signal at a repetition rate greater than the highest frequency of said electrical replica and producing a pulse whenever either said electrical replica or said electrical signal is of a given polarity to produce first and second pulse trains respectively corresponding to said electrical replica and said electrical signal;

compressing said first and second pulse trains in real time to increase the pulse repetition rate thereof while maintaining constant the relative time spacing between pulses; and cross correlating said compressed first and second pulse trains at a predetermined number of time-phase relationships to each other whereby travel time is established in accordance with the value of time-phase relationship between said pulse train corrsponding to a maximum value of correlation magnitude.

3. In the method of measuring the travel time along at least one path of propagation through the earth between spaced first and second points thereon of a vibratory signal having a characteristic thereof varying in accordance with a binary code of maximal length and which is nonrepetitive during a time interval substantially longer than the travel time of said signal along any of those paths of its propagation through the earth by which it reaches said second point at usable energy levels, and wherein is produced an electrical replica of the signal as transmitted and an electrical signal representative of the vibratory signal as received at said second point, the improvement which comprises:

repetitively detecting the polarity of said electrical replica and said electrical signal at a repetition rate greater than the highest frequency of said electrical replica and producing a pulse whenever either said electrical replica or said electrical signal is of a given polarity to produce first and second pulse trains respectively corresponding to said electrical replica and said electrical signal;

continuously compressing in real time said first and second pulse trains while maintaining constant the relative time spacing between pulses;

storing said compressed first pulse train in reproducible form;

repetitively reproducing said first pulse train; and cross correlating said repetitively reproduced first pulse train with the time-compressed second pulse train at a predetermined number of time-phase relationships therebetween whereby travel time is established in accordance with the value of time-phase relationships between said pulse trains corresponding to a maximum value of correlation magnitude.

4. In the method of measuring the travel time along at least one path of propagation through the earth between spaced first and second points thereon of a vibratory signal having a characteristic thereof varying in accordance with a binary code of maximal length and which is nonrepetitive during a time interval substantially longer than the travel time of said signal along any of those paths of its propagation through the earth by which it reaches said second point at usable energy levels, and wherein is produced an electrical replica of the signal as transmitted and an electrical signal representative of the vibratory signal as received at said second point, the improvement which comprises:

repetitively detecting the polarity of said electrical replica and said electrical signal at a repetition rate high relative to the highest frequency of said electrical replica and producing a pulse whenever either said electrical replica or said electrical signal is of a given polarity to produce first and second pulse trains respectively corresponding to said electrical replica and said electrical signal;

continuously compressing in real time said first and second pulse trains while maintaining constant the relative time spacing between pulses;

storing the compressed first pulse train in reproducible form, successively reproducing a plurality of different overlapping portions of said second pulse train equal in duration to said first pulse train; and repetitively reproducing said first pulse train and cross correlating the reproduced first pulse train with each of the reproduced plurality of different overlapping portions of said second pulse train whereby travel time is established in accordance with the value of time-phase relationships between said pulse trains corresponding to a maximum value of correlation magnitude.

5. In the method of measuring the travel time along at least one path of propagation through the earth between spaced first and second points thereon of a vibratory signal which is substantially longer than the travel time of such signal along any of those paths of its propagation through the earth by which it reaches said second point at usable energy levels, the improvement which comprises:

forming a shift register binary code of maximal length;

varying a characteristic of said vibratory signal in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said modulated vibratory signal and a second electrical signal representative of the modulated vibratory signal as received at said second point;

producing electrical pulses at salient points in the first electrical signal to form a first pulse train and at salient points in the second electrical signal to form a second pulse train;

compressing said first and second pulse trains in real time by decreasing the real time spacing between individual pulses thereof while maintaining constant the relative time spacing between said individual pulses; and cross correlating said first and second pulse trains at a predetermined number of time-phase relationships therebetween whereby travel time is established in accordance with the value of time-phase relationship between said pulse trains corresponding to a maximum value of correlation magnitude.

6. In the method of measuring the travel time along at least one path of propagation through the earth between spaced first and second points thereon of a vibratory signal which is substantially longer than the travel time of such signal along any of those paths of its propagation through the earth by which it reaches said second point at usable energy levels, the improvement which comprises:

forming a shift register binary code of maximal length;

varying a characteristic of said vibratory signal in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said modulated vibratory signal and a second electrical signal representative of the modulated vibratory signal as received at said second point;

repetitively detecting the polarity of each of said electrical signals at a repetition rate greater than the highest frequency of said first electrical signal and producing a pulse whenever either signal is of a given polarity to produce first and second pulse trains respectively corresponding to said first and second electrical signals;

continuously compressing in real time said first and second pulse trains by decreasing the real time spacing between the individual pulses thereof while maintaining constant the relative time spacing therebetween; and.

cross correlating said first and second pulse trains at a predetermined number of time-phase relationships therebetween whereby travel time is established in accordance with the value of time-phase relationship between said pulse trains corresponding to a maximum value of correlation magnitude.

7. In the method of measuring the travel time along at least one path of propagation through the earth between spaced first and second points thereon of a vibratory signal which is substantially longer than the travel time of such signal along any of those paths of its propagation through the earth by which it reaches said second point at usable energy levels, the improvement which comprises:

forming a shift register binary code of maximal length;

varying a characteristic of said vibratory signal in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said modulated vibratory signal and a second electrical signal representative of the modulated vibratory signal as received at said second point;

repetitively detecting the polarity of each of said electrical signals at a repetition rate greater than the highest frequency of said first electrical signal and producing a pulse whenever either signal is of a given polarity to produce first and second pulse trains respectively corresponding to said first and second electrical signals;

continuously compressing in real time said first and second pulse trains by decreasing the real time spacing between the individual pulses thereof while maintaining constant the relative time spacing therebetween;

storing said compressed first pulse train in reproducible form;

repetitively reproducing said first pulse train; and repetitively cross correlating said repetitively reproduced first pulse train with the time-compressed second pulse train at a predetermined number of time-phase relationships therebetween whereby travel time is established in accordance with the value of time-phase relationship between said pulse trains corresponding to a maximum value of correlation magnitude.

8. In the method of measuring the travel time along at least one path of propagation through the earth between spaced first and second points thereon of a vibratory signal which is substantially longer than the travel time of such signal along any of those paths of its propagation through the earth by which it reaches said second point at usable energy levels, the improvement which comprises:

forming a shift register binary code of maximal length;

varying a characteristic of said vibratory signal in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said modulated vibratory signal and a second electrical signal representative of the modulated vibratory signal as received at said second point;

repetitively detecting the polarity of each of said electrical signals at a repetition rate greater than the highest frequency of said first electrical signal and producing a pulse whenever either signal is of a given polarity to produce first and second pulse trains respectively corresponding to said first and second electrical signals;

continuously compressing in real time said first and second pulse trains by decreasing the real time spacing between the individual pulses thereof while maintaining constant the relative time spacing therebetween;

storing said compressed first pulse train in reproducible form;

with production of each portion of said time-compressed second pulse train, simultaneously reproducing said time-compressed first pulse train, and cross correlating said reproduced time-compressed first pulse train with each portion of said time-compressed second pulse train to derive an output signal indicative of correlation therebetween; and recording the output signals thus obtained as a function of the time-phase relationship between the reproduced time-compressed first pulse train and said each portion of said time-compressed pulse train.

References Cited by the Examiner

UNITED STATES PATENTS

| 2,958,039 | 10/60 | Anderson | 343—100.7 X |
| 2,989,726 | 6/61 | Crawford | 340—15.5 |
| 3,046,545 | 7/62 | Westerfield | 235—181 X |

SAMUEL FEINBERG, *Primary Examiner.*

CHESTER L. JUSTUS, *Examiner.*